United States Patent [19]

Teraoka

[11] 4,368,808
[45] Jan. 18, 1983

[54] HUB CLUTCH

[75] Inventor: Masao Teraoka, Sano, Japan

[73] Assignee: Tochigi-Fuji Sangyo Kabushiki Kaisha, Tochi, Japan

[21] Appl. No.: 172,852

[22] Filed: Jul. 28, 1980

[51] Int. Cl.³ .............................................. F16D 11/10
[52] U.S. Cl. .................................. 192/36; 192/67 R; 192/54; 192/89 A; 192/93 A
[58] Field of Search .................... 192/35, 54, 36, 67 R, 192/93 A, 89 A, 93 R, 81 R, 31, 67 A; 74/337.5

[56] References Cited

U.S. PATENT DOCUMENTS

| | | | |
|---|---|---|---|
| 2,884,101 | 4/1959 | Warn . | |
| 2,915,158 | 12/1959 | Smith | 192/81 R |
| 2,929,260 | 3/1960 | Hodkin | 74/337.5 |
| 3,124,377 | 3/1964 | O'Brien et al. | 192/89 A |
| 3,217,847 | 11/1965 | Petrak | 192/31 |
| 4,192,411 | 3/1980 | Fogelberg | 192/36 |
| 4,269,294 | 5/1981 | Kelbel | 192/93 A |
| 4,281,749 | 8/1981 | Fogelberg | 192/36 |
| 4,282,959 | 8/1981 | Schachner | 192/35 |

Primary Examiner—George H. Krizmanich
Attorney, Agent, or Firm—Wenderoth, Lind & Ponack

[57] ABSTRACT

A hub clutch for wheels of a four-wheel drive vehicle need not be operated by the driver from the exterior of the vehicle. The hub clutch comprises a sleeve drive clutch member fixed to a drive shaft, a slide clutch member engaged to the drive clutch member through splines formed thereon and movable in the axial direction, and a driven clutch member adapted to be connected to or disconnected from the slide clutch member by axial movement thereof. A retainer is engaged to a stationary system, and a cam mechanism is provided for moving the slide clutch member in the axial direction, thereby carrying out a clutch connection when relative rotation is present between the retainer and the slide clutch member, and for releasing the clutch connection when the relative rotation becomes absent and a drive is provided from the driven clutch member side.

5 Claims, 7 Drawing Figures

HUB CLUTCH

BACKGROUND OF THE INVENTION

This invention relates to hub clutches and more particularly to a hub clutch for front wheels of a four-wheel drive vehicle, wherein there is no necessity for a driver of a vehicle operating the hub clutch from the exterior of the vehicle.

Normally such front wheels receive a driving force from a road surface during rear-wheel drive running periods. It is desirable during such periods that the front wheels be free-rolling when they are not being driven in order to reduce drag on the engine, to prevent rotation of the driving shafts, gears, etc. and to avoid unnecessary wear for improving running efficiency and fuel consumption. Therefore, it is required to provide an apparatus or hub clutch for preventing transfer of the driving force from the road surface to the components back to the front wheels.

The hub clutch developed for such a demand includes, for example, the following:

FIG. 1 is a schematic sectional view of the hub clutch which is disclosed in my pending application, U.S. Ser. No. 968,356. This hub clutch has features in that a shaft portion 112a of a bolt 112 to secure a case 110 to a wheel hub 111 is partially exposed on the inner surface of the case 100. The exposed shaft portion 112a is slidably engaged a groove 114 formed on the outer periphery of a driven clutch 113 adapted to be coupled with a drive clutch 115. The torque of the driven clutch 113 is directly transferred to the bolt 112 and then to the wheel hub 111 through the bolt 112. According to this invention, it is unnecessary to give a torque transfer function to the case itself and consequently, it is possible to use a lower strength and lighter weight material such as a light alloy for the case 110. This results in a light weight hub clutch. Since it is also not necessary to form a spline on the inner periphery of the case 110, the case easily may be manufactured in fewer process operations, and the driven clutch 113 has a space with a larger inner diameter so that it is easy to install other parts therein and the hub clutch becomes smaller in size.

However, this prior hub clutch has a disadvantage that an operator must get off the vehicle to switch a selecting lever 120 by a manual operation upon the clutch on-off operation, i.e., the switchover from four-wheel drive to two-wheel drive or vice versa.

FIG. 2A is a partly sectional fragmentary elevation view of a hub clutch disclosed in U.S. Pat. No. 2,884,101. FIG. 2B is a cross-sectional view taken of line A-A along FIG. 2A. This clutch comprises a polygonal sleeve or cylindrical cam 220 fitted to a drive shaft 212, a cylindrical case 228 disposed radially outwardly of the cam 220 and fixed to a hub 217 by means of bolt 276, a plurality of rollers 224 disposed between the cam 220 and the case 228 and positioned in a retainer or roller cage 226 at equal intervals therearound, and a spring 234.

Unless external force is applied to the retainer clockwise or counterclockwise, a weak contact situation is maintained by means of the spring and power transmission is not effected. By switching a selecting lever from a two-wheel drive side over to a four-wheel drive side, the drive shaft, i.e. the cam, is rotated, the retainer is not rotated because an auxiliary friction member contacts with a stationary system, and the roller is wedged in between the cam and case, thereby power transmission is carried out. When the selective lever is changed over to return to the two-wheel drive side, the retainer is returned to the original position due to no rotation of the drive shaft, thereby cutting off power transmission. In this way, this hub clutch accomplishes a changeover operation thereof by shifting a relative position between the cam and the retainer to move the rollers, and therefore the connection and disconnection of the hub clutch can be easily and surely achieved.

In this prior hub clutch referred to as automatic, there have been observed several disadvantages as follows:

(1) an engine brake may fail to work, and thus upon off-load running, a driver must get off the vehicle and turn a manually operating selective lever 270 to lock it for working the engine brake; (2) the structures including the locking mechanism are very complicated; (3) it is not durable and heavy.

SUMMARY OF THE INVENTION

It is therefore an object of the present invention to provide a hub clutch for wheels of a four-wheel drive vehicle wherein there is no need for a driver to get off the vehicle for switchover of a selecting lever.

It is another object of the present invention to provide a hub clutch for wheels of a four-wheel drive vehicle which can transmit torque in either direction, such as for engine braking and the like.

Still another object of the present invention is to provide a hub clutch for wheels of a four-wheel drive vehicle which is simple in construction and light in weight, and is excellent in durability and reliability of operation.

According to the present invention, a hub clutch for providing the torque connection between a power shaft and a wheel hub of a four-wheel drive vehicle comprises a sleeve drive clutch member fixed to a drive shaft, a slide clutch member disposed radially outward of the drive clutch member, engaged to the drive clutch member through splines formed thereon, and movable in an axial direction of the drive shaft, and a driven clutch member disposed radially outward of the slide clutch member, connected to or disconnected from the slide clutch member by the axial movement thereof. A retainer is engaged to a stationary system with a predetermined braking. A cam is provided for moving the slide clutch member in the axial direction thereby carrying out a clutch connection when a relative rotation is present between the retainer and the slide clutch member, and for releasing the clutch connection when the relative rotation is absent and the drive is provided from the driven clutch member side.

BRIEF DESCRIPTION OF THE DRAWINGS

The above and other objects, advantages and features of the present invention will appear from the following description taken in conjunction with the accompanying drawings, in which.

DESCRIPTION OF THE PREFERRED EMBODIMENTS

Figure 1:
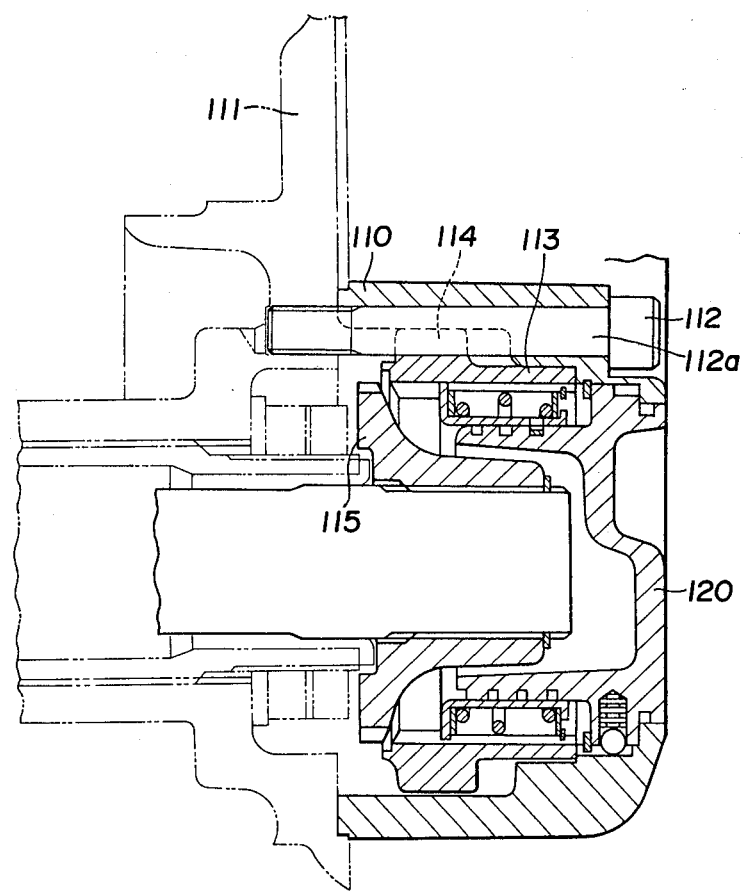
FIG. 1 is a longitudinal sectional view illustrating a hub clutch according to the prior art.
Figures 2A, 2B:
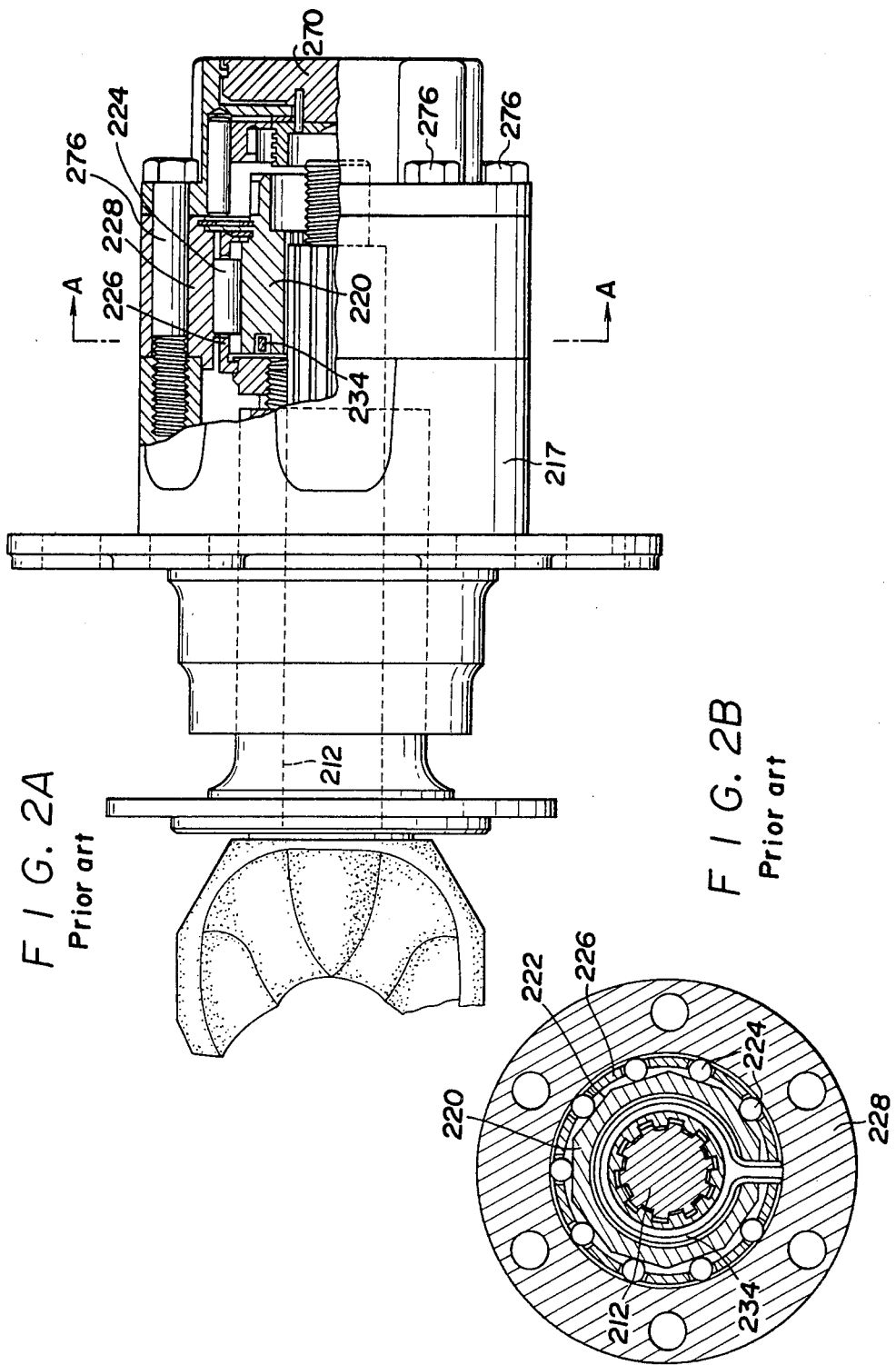
FIG. 2A is a partly sectional fragmentary elevation view of a hub clutch according to another prior art arrangement.
FIG. 2B is a cross-sectional view taken on line A—A of FIG. 2A.
Figure 3A:
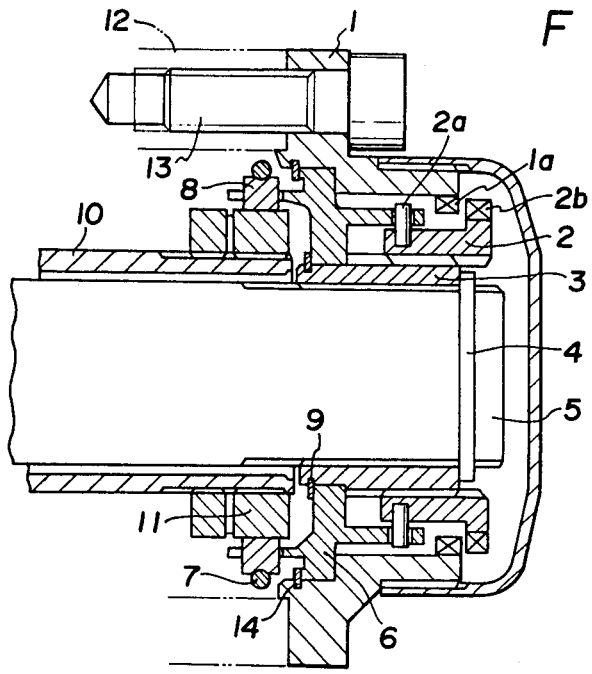
FIG. 3A is a longitudinal sectional view illustrating an embodiment of the present invention in the disconnected condition of the hub clutch.

Referring now to FIG. 3A, there is shown a hub clutch in its disconnected condition according to the present invention. In FIG. 3A, a sleeve drive clutch member 3 fixed to a drive shaft 5 is engaged with a slide clutch member 2 through splines formed thereon. Slide clutch member 2 is axially movable, is disposed radially outward of the drive clutch member 3, and has coupling teeth 2b formed on its outer periphery. A driven clutch member 1 disposed radially outward of the slide clutch member 2 has coupling teeth 1a, adapted to be connected to or disconnected from the teeth 2b of the slide clutch member 2 by axial movement of slide clutch member 2, on its inner periphery, and the peripheral portion of the driven clutch member 1 is fixed to a wheel hub 12 by means of a plurality of bolts 13. The slide clutch member 2 has a pin member 2a tightly fitted therein. A snap ring 4 is provided on the periphery of the drive shaft 5 so as to fix the drive clutch member 3 axially in place. A brake 8 to retard rotation of a retainer 6 is mounted slidably in a rotational direction on a stationary or nonrotatable cylindrical shaft 10 through a nut 11. On the brake 8 is provided a garter spring 7. Brake 8, upon retarding rotation of retainer 6, creates a limited relative rotation between slide clutch member 2 and retainer 6.

Figure 4:
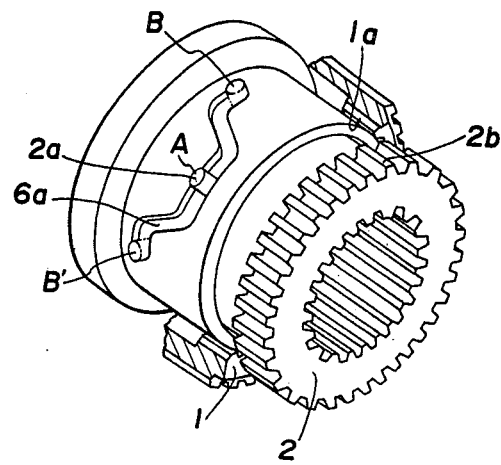
FIG. 4 is a perspective view of the cam means shown in FIGS. 3A and 3B.

In FIG. 3A, a cam portion projected axially outwardly and integrally formed with the retainer 6 is retained with a predetermined space from the outer peripheral surface of the slide clutch member 2. The retainer 6 has an axially convex cam groove 6a cut in its surface as shown in FIG. 4. The pin member 2a tightly fitted into the slide clutch member 2 is adapted to be moved in this cam groove 6a. Under the disconnected condition of hub clutch shown in FIG. 3A, the pin member 2a is situated in the position of A shown in FIG. 4. In this condition, the slide clutch member 2 is situated in a righthand-most end of an axially moving path and thus it is not engaged with the coupling teeth 1a of the driven clutch member 1.

The slide clutch member 2 adapted to be rotated with the rotation of the drive clutch member 3 as well as the drive shaft 5 during a driving mode of drive shaft 5, owing to the movement of the pin member 2a following that rotation from the position A to position B' shown in FIG. 4, is permitted to move axially inward or leftward in the drawing by the pin member 2a, resulting in engagement of its teeth 2b with the teeth 1a of the driven clutch member 1. Numbers 4, 9, and 14 represent snap rings.

Figure 3B:
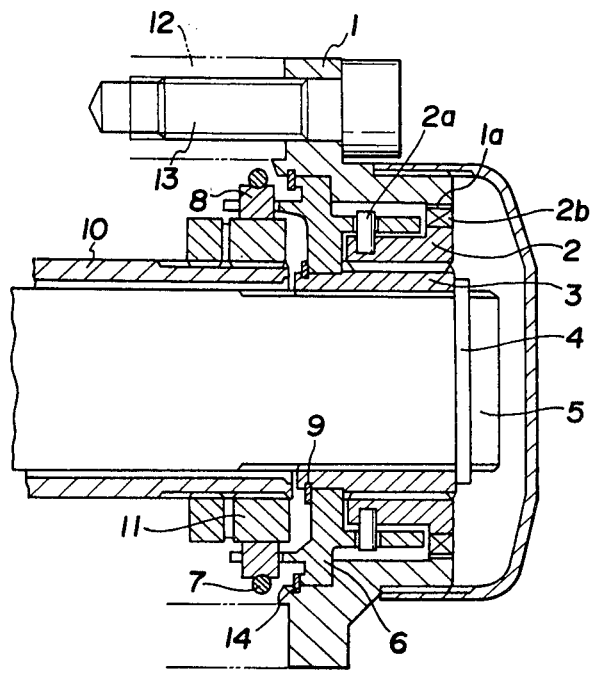
FIG. 3B shows the connected condition of the hub clutch shown in FIG. 3A.

The coupling teeth 2b of the slide clutch member 2 thrust axially inward by means of the pin member 2a become engaged with the coupling teeth 1a of the driven clutch member 1 disposed radially outwardly thereof. FIG. 3B shows the situation of complete clutching at a time when the pin member 2a is moved from the position A to B or B'. At this time, the teeth 2b of the slide clutch member 2 engage completly with the teeth 1a of the driven clutch member 1, thereby resulting in a hub clutch-on situation, i.e., a four-wheel drive situation.

Figure 5:
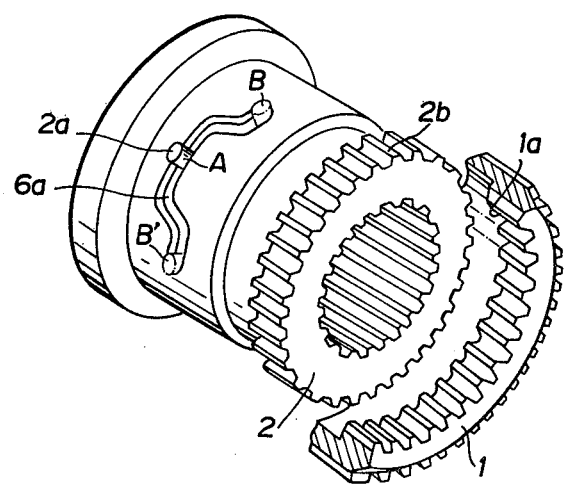
FIG. 5 is a perspective view of the cam means according to another embodiment of the present invention.

FIG. 5 shows another preferred embodiment of the hub clutch according to the present invention, illustrating a case in which the direction of the cam groove 6a shown in FIG. 4 is reversed, i.e., the cam groove 6a is formed axially concave. In this case, if the slide clutch member 2 is moved axially leftward in the drawing, it will be disengaged from the driven clutch member 1 thereby providing a hub clutch-off situation, and if it is moved axially rightward, it will be engaged with the driven clutch member 1 thereby providing a hub clutch-on situation.

An operation of the hub clutch indicated above will hereinafter be described.

OPERATION

(1) Upon Switchover to Four-Wheel Drive

In FIG. 3A, when switching a selecting lever (not shown, arranged in a suitable place adjacent a driver's seat over to a four-wheel drive situation, if the drive shaft 5 is rotated, both the drive clutch member 3 and the slide clutch member 2 are rotated along with the drive shaft 5. On the other hand, rotation of the retainer 6 is retarded due to the action of the brake 8. Consequently a relative rotation is produced between the retainer 6 and the slide clutch member 2 and the pin member 2a tightly fitted into the slide clutch member 2 is moved from the position A to position B or B' by the action of the cam groove 6a, i.e., the slide clutch member 2 is moved axially inward or leftward in the drawing. Therefore, the drive shaft 5 is connected to the driven clutch member 1, resulting in a four-wheel drive situation.

(2) Upon Switchover to Two-Wheel Drive

In FIG. 3B, the above mentioned selecting lever is switched from the four-wheel drive situation to a two-wheel drive situation, first to intercept the power to the drive shaft 5, i.e. to a non-driving mode thereof, and then to permit the driven clutch member 1 to rotate in a direction opposite to the direction of previous movement (the latter operation can be achieved by permitting the vehicle to move just a short distance in the direction opposite to the direction which it had previously moved. Both the slide clutch member 2 and the drive shaft 5 are rotated by the driven clutch member 1, whereas rotation of the retainer 6 will be retarded due to resistance of the brake shoe 8. Consequently, as in the case of switchover to four-wheel drive described above, a relative rotation is produced between the retainer 6 and the slide clutch member 2, and the pin member 2a is moved from the position B or B' to the position A shown in FIG. 4 by the action of the axially convexed cam groove 6a. Thus, the slide clutch member 2 is moved axially rightward or outward to cause it to disengage from the driven clutch member 1, resulting in stoppage of the drive shaft 5 and skidding of the driven clutch member 1, thereby providing a two-wheel drive situation.

Furthermore, in the case of the axially concaved cam groove 6a of the retainer 6 as shown in FIG. 5, when the slide clutch member 2 is moved leftward in the drawing, a hub clutch-off, and hence two-wheel drive, situation is obtained, and when the slide clutch member 2 was moved rightward, a hub clutch-on, and hence four-wheel drive, situation is obtained.

Although the present invention has been described with reference to a preferred embodiment thereof, many modifications and alterations may be made within the spirit and scope of the present invention.

What is claimed is:

1. A hub clutch for use in a wheel drive assembly of a four-wheel drive vehicle, the assembly being of the type including a drive shaft selectively operable in a driving mode and rotating to transmit a rotational driving force and in a non-driving mode to interrupt such rotational driving force, and a hub positively driven when the drive shaft is in the driving mode thereof and freely rotatable when the drive shaft is in the non-driving mode thereof, said hub clutch comprising:

a sleeve drive clutch member adapted to be fixed to a drive shaft to rotate therewith during the driving mode thereof;

a driven clutch member positioned radially outwardly of said drive clutch member and adapted to be fixed to a hub;

a slide clutch member positioned radially between said drive clutch member and said driven clutch member, said slide clutch member being mounted on said drive clutch member for rotation therewith and for axial movement relative thereto between an engaged first position in engagement with said driven clutch member, thereby to transmit rotation of said drive clutch member to said driven clutch member, and a disengaged second position out of engagement with said driven clutch member;

a retainer mounted for rotation with said slide clutch member and adapted to be mounted on a nonrotatable portion of the assembly;

brake means for applying a predetermined braking pressure to said retainer, thereby for retarding rotation of said retainer and creating a limited relative rotation between said slide clutch member and said retainer; and cam means associated with said slide clutch member and said retainer for, upon rotation of said drive clutch member and said slide clutch member and the operation of said brake means to create said limited relative rotation between said slide clutch member and said retainer, moving said slide clutch member axially from said disengaged second position to said engaged first position, and for, upon interruption of rotation of drive clutch member by the drive shaft and the supply of a rotation force to said driven clutch member and the operation of said brake means to create said limited relative rotation between said slide clutch member and said retainer, moving said slide clutch member axially from said engaged first position to said disengaged second position, said cam means comprising a curved guide groove formed in one of said retainer or said slide clutch member and a pin member fixed to the other of said retainer or said slide clutch member, said pin member extending into said guide groove, such that upon said limited relative rotation between said slide clutch member and said retainer said pin member follows the curve of said guide groove, thereby achieving axial movement of said slide clutch member.

2. A hub clutch as claimed in claim 1, wherein said curved guide groove is formed in said retainer, and said pin member is fixed to said slide clutch member.

3. A hub clutch as claimed in claim 2, wherein said guide groove is convex axially outwardly of said drive clutch member.

4. A hub clutch as claimed in claim 2, wherein said guide groove is concave axially outwardly of said drive clutch member.

5. A hub clutch as claimed in claim 1, wherein said retainer is mounted radially about said drive clutch member, and said brake means comprises a brake shoe adapted to engage the nonrotatable portion of the assembly and a garter spring urging said brake shoe toward the nonrotatable portion.

* * * * *